(12) United States Patent
Vlazny et al.

(10) Patent No.: US 7,922,585 B2
(45) Date of Patent: Apr. 12, 2011

(54) METHODS AND SYSTEMS FOR COMMUNICATING PARIMUTUEL WAGER DETAILS AND RESULTS

(75) Inventors: Kenneth A. Vlazny, York, PA (US); Brendan Burgess, Poway, CA (US); Scott B. Pfennighausen, San Diego, CA (US)

(73) Assignee: United Tote Company, Glen Rock, PA (US)

( * ) Notice: Subject to any disclaimer, the term of this patent is extended or adjusted under 35 U.S.C. 154(b) by 1687 days.

(21) Appl. No.: 10/987,953

(22) Filed: Nov. 12, 2004

(65) Prior Publication Data

US 2005/0181876 A1 Aug. 18, 2005

Related U.S. Application Data

(63) Continuation-in-part of application No. 10/731,701, filed on Dec. 8, 2003.

(51) Int. Cl.
*G06F 17/00* (2006.01)

(52) U.S. Cl. ........................................................ 463/42

(58) Field of Classification Search .............. 463/16–25, 463/42
See application file for complete search history.

(56) References Cited

U.S. PATENT DOCUMENTS

| | | | |
|---|---|---|---|
| 3,909,002 A | 9/1975 | Levy | |
| 4,322,612 A | 3/1982 | Lange | |
| 4,669,730 A | 6/1987 | Small | |
| 4,815,741 A | 3/1989 | Small | |
| 5,038,022 A | 8/1991 | Lucero | |
| 5,265,874 A | 11/1993 | Dickinson et al. | |
| 5,321,241 A | 6/1994 | Craine | |
| 5,324,035 A | 6/1994 | Morris et al. | |
| 5,457,306 A | 10/1995 | Lucero | |
| 5,476,259 A | 12/1995 | Weingardt | |
| 5,557,086 A | 9/1996 | Schulze et al. | |
| 5,559,312 A | 9/1996 | Lucero | |
| 5,770,553 A | 6/1998 | Franchi | |

(Continued)

FOREIGN PATENT DOCUMENTS

WO 00/67215 11/2000

(Continued)

OTHER PUBLICATIONS

Colorado Lottery, https://www.coloradolotterycom/mylottery/login.cfm (visited Sep. 9, 2004).

(Continued)

*Primary Examiner* — Ronald Laneau
(74) *Attorney, Agent, or Firm* — TraskBritt

(57) ABSTRACT

Methods and systems of conducting parimutuel wagering activities are disclosed. A method of sending a message to a patron of a parimutuel gaming system includes providing the patron an opportunity to establish an identity on the parimutuel gaming system. Responsive to the patron establishing the identity, the patron is provided an opportunity to associate a virtual address with the identity, and a message may be sent to the virtual address. A method of communicating a result of a parimutuel gaming activity to a player includes providing the player with an opportunity to place a parimutuel wager and to associate a virtual address with the parimutuel wager. A message is sent to the virtual address, wherein the message includes a result of the parimutuel wager. A parimutuel gaming system including a computer is operatively configured with software operatively configured to enable the computer to conduct the parimutuel gaming activities.

24 Claims, 3 Drawing Sheets

U.S. PATENT DOCUMENTS

| | | |
|---|---|---|
| 5,779,547 A | 7/1998 | SoRelle et al. |
| 5,800,268 A | 9/1998 | Molnick |
| 5,806,045 A | 9/1998 | Biorge et al. |
| 5,811,772 A | 9/1998 | Lucero |
| 5,830,068 A | 11/1998 | Brenner et al. |
| 5,839,956 A | 11/1998 | Takemoto |
| 5,902,983 A | 5/1999 | Crevelt et al. |
| 5,952,640 A | 9/1999 | Lucero |
| 5,959,277 A | 9/1999 | Lucero |
| 5,984,779 A | 11/1999 | Bridgeman et al. |
| 6,099,406 A * | 8/2000 | Demster .................. 454/236 |
| 6,190,256 B1 | 2/2001 | Walker et al. |
| 6,307,956 B1 | 10/2001 | Black |
| 6,331,148 B1 | 12/2001 | Krause et al. |
| 6,347,738 B1 | 2/2002 | Crevelt et al. |
| 6,379,248 B1 | 4/2002 | Jorasch et al. |
| 6,383,074 B1 | 5/2002 | Boggs |
| 6,390,917 B1 | 5/2002 | Walker et al. |
| 6,394,907 B1 | 5/2002 | Rowe |
| 6,450,887 B1 * | 9/2002 | Mir et al. .................. 463/42 |
| 6,508,710 B1 | 1/2003 | Paravia et al. |
| 6,511,377 B1 | 1/2003 | Weiss |
| 6,547,131 B1 | 4/2003 | Foodman et al. |
| 6,558,255 B2 | 5/2003 | Walker et al. |
| 6,607,441 B1 | 8/2003 | Acres |
| 6,634,946 B1 | 10/2003 | Bridgeman |
| 6,652,380 B1 | 11/2003 | Luciano |
| 6,702,676 B1 * | 3/2004 | Ota et al. .................. 463/41 |
| 6,722,980 B2 | 4/2004 | Stronach |
| 6,811,488 B2 | 11/2004 | Paravia et al. |
| 6,830,514 B2 | 12/2004 | Meyer et al. |
| 7,225,316 B2 * | 5/2007 | Thadani .................. 711/202 |
| 7,300,353 B2 * | 11/2007 | Goto et al. .................. 463/42 |
| 2001/0051540 A1 | 12/2001 | Hindman et al. |
| 2002/0028708 A1 | 3/2002 | Busch et al. |
| 2002/0065566 A1 | 5/2002 | Aronson et al. |
| 2002/0094858 A1 | 7/2002 | Yacenda |
| 2002/0098883 A1 | 7/2002 | Packes, Jr. et al. |
| 2002/0111213 A1 | 8/2002 | McEntee et al. |
| 2002/0177483 A1 | 11/2002 | Cannon |
| 2003/0036425 A1 | 2/2003 | Kaminkow et al. |
| 2003/0078094 A1 | 4/2003 | Gatto et al. |
| 2003/0092478 A1 | 5/2003 | Weil |
| 2003/0228907 A1 | 12/2003 | Gatto et al. |
| 2003/0228910 A1 | 12/2003 | Jawaharlal et al. |
| 2004/0014514 A1 | 1/2004 | Yacenda |
| 2004/0029630 A1 | 2/2004 | Walker et al. |
| 2004/0036212 A1 | 2/2004 | Walker et al. |
| 2004/0082384 A1 | 4/2004 | Walker et al. |
| 2004/0087360 A1 | 5/2004 | Chamberlain et al. |
| 2004/0111358 A1 * | 6/2004 | Lange et al. .................. 705/37 |
| 2004/0229671 A1 | 11/2004 | Stronach et al. |
| 2004/0235503 A1 * | 11/2004 | Koponen et al. .............. 455/466 |
| 2008/0085763 A1 | 4/2008 | Randhawa |
| 2008/0153583 A1 | 6/2008 | Huntley et al. |
| 2009/0042631 A1 | 2/2009 | Randhawa |
| 2009/0090923 A1 | 4/2009 | Murayama |
| 2009/0093292 A1 | 4/2009 | Randhawa |
| 2009/0280886 A1 | 11/2009 | Randhawa |

FOREIGN PATENT DOCUMENTS

| | | |
|---|---|---|
| WO | WO 02/38233 A1 | 5/2002 |
| WO | 03/073386 A2 | 9/2003 |
| WO | WO 03/090139 A1 | 10/2003 |
| WO | 03/104972 A1 | 12/2003 |
| WO | 2004/092993 A1 | 10/2004 |

OTHER PUBLICATIONS

The Starbucks Card Duetto™ Visa®, http://www.stabucks.com/card/duetto.asp?cookie%5Ftest=1, Dec. 2, 2003, 1 page.

Nyra One AccountSM Membership Kit, www.nyra.com, 17 pages.

International Search Report dated August 2, 2007, for International Application No. PCT/US06/08239 (2 pages).

Players' Choice Club Racing Membership Application (visited Jan. 18, 2005) <http://www.pennbet.com> (2 pages).

Account Wagering Services, Penn National Gaming, Inc. (visited Jan. 18, 2005) <http://www.pennbet.com/terms_conditions.html>(5 pages).

International Search Report for International Application No. PCT/US06/34550 mailed Jul. 21, 2008.

* cited by examiner

| Pgm | Horse | Win | Place | Show | Total WPS Pool: $15,011 |
|---|---|---|---|---|---|
| 6 | Redcuda | 6.20 | 3.40 | 2.60 | |
| 5 | Royal Chalice | | 2.80 | 2.20 | |
| 2 | Devilsh Intentions | | | 2.40 | |

| Wager Type | Winning Numbers | Payoff | Pool | Carryover |
|---|---|---|---|---|
| $2 Exacta | 6-5 | 11.20 | 7,688 | |
| $2 Trifecta | 6-5-2 | 21.20 | 7,278 | |

METHODS AND SYSTEMS FOR COMMUNICATING PARIMUTUEL WAGER DETAILS AND RESULTS

CROSS-REFERENCE TO RELATED APPLICATION

This application is a continuation-in-part of U.S. patent application Ser. No. 10/731,701, filed Dec. 8, 2003, pending, the contents of the entirety of which are incorporated by this reference.

BACKGROUND OF THE INVENTION

1. Field of the Invention:

The invention relates generally to the field of gaming and, more particularly to parimutuel betting methods and parimutuel gaming systems.

2. State of the Art:

Parimutuel betting is a system of cooperative wagering where the holders of winning tickets divide the total amount of money bet on a race or other pool after deductions for taxes and racetrack expenses are taken out of the pool. In parimutuel betting, the payoff odds are determined by the number of people betting. For instance, if a lot of people bet on the eventual winner, the payoff odds are lower since the winners split the pool. Parimutuel betting is typically used at horseracing tracks, but is also used at other types of racing tracks including greyhound tracks, automobile tracks, and jai alai frontons.

Parimutuel wagers are placed at racetracks, off track betting (OTB) sites, on betting websites and by telephone. The wagers are generally funded with cash, printed vouchers or a wager account established by a patron on a parimutuel gaming system. When patrons place wagers with cash or vouchers, the patron receives a redeemable ticket in exchange for the cost of the wager. When a wager account is used to fund the wager, the wagers are generally not printed, but are associated with the wager account of the patron and winnings are automatically credited to the wager account when a race result goes official.

Once the race result is official, patrons watch for official result postings on television monitors or tote boards and compare their tickets to the result postings to determine the results of their wagers and the value of their winnings. If the wager was made with cash or a voucher, the patrons may feed the tickets into a staffed wagering terminal or a self-service wagering terminal to receive credit for their winnings. If the wager was placed with a wager account, the patron can check their wager account to verify that winning wagers have been credited to their wager account.

Existing processes for communicating parimutuel wagering results to the patron requires significant patron effort, even when simple "straight" pool wagers, such as Win bets, have been placed. The inconvenience to the patron becomes more pronounced when the patron has made complex bet combinations or has placed wagers into multiple parimutuel pools. In these cases, it can be difficult for bettors to understand how the posted results affect their wagers and to calculate their winnings in cash or an account balance. This difficulty is caused by the number of wagers placed, the fact that prices of the race results may be displayed on tote boards or television monitors in denominations of $1 or $2, and because the patron's ticket may be of a different value denomination than the posted price value.

Referring to FIG. 1, there is illustrated a known display of prices for a completed race. For a patron to calculate the total value of a $1 Win/Place/Show wager on the #6 horse, the patron would have to perform the following calculation: ½* (6.20+3.40+2.60)−$3 for the original bet=$6.10 payout−$3 bet=a $3.10 profit. Since a novice patron may not understand how to calculate the value of a wager, the novice patron would feel intimidated and have an unenjoyable parimutuel gaming experience. The tickets of FIG. 2 illustrate how complex some wagers placed in a single pool can become. The tickets of FIG. 2 indicate that the player covered forty Trifecta combinations, and the tickets are a printed record of the wagers.

In a simulcast environment, the race results and payoff prices are typically displayed on television monitors, wherein the television monitors display substantially the same information as illustrated in FIG. 1. However, the availability of the race results on the television monitors is limited since the parimutuel gaming establishments usually display previously run race results on less prominent television monitors in order to make room for upcoming races at other tracks.

Because of the complexity of the wagers and the limited access to the race results, patrons frequently return to self-service betting terminals and feed each ticket they have into the betting terminal to see if the ticket is a winner. This may prevent or hinder other patrons from placing new wagers. When betting off-site with a telephone wagering system or on the Internet, the patron must either call the account wagering line or log on to a website and re-enter their account number and personal identification number (PIN) or password in order to retrieve their updated account balance or view the results of a race.

These existing processes cause numerous problems. As one example, at onsite parimutuel gaming establishments, it is necessary to print paper tickets or bet receipts in order to aid the player in recalling his/her bet selections and, thus, the cost of providing the wagering machines and the tickets combined with facility maintenance to clean up the discarded tickets increases the overall operating costs. Further, patron dissatisfaction grows due to the effort required to obtain the betting results. For instance, the patron may need to feed numerous tickets into the wagering terminals. Further, due to poor print quality of the ticket or ticket wear, it is not uncommon for terminals to reject a winning ticket. Thus, the player may become dissatisfied if they thought the ticket was a winner, but the ticket is rejected by a gaming terminal and leaves the patron to infer that the ticket is a loser. The large number of discarded tickets may also create an incentive for "stoopers" who sift through the discarded tickets in an attempt to find a discarded winning ticket. These "stoopers" are viewed as undesirable to the parimutuel wagering establishment.

These problems may decrease the chances that the patrons will return to the racetrack, since the customer may perceive that the problems are caused by the racetrack being an out-of-date facility that relies on old and inconvenient technology. Further, the racetrack may experience decreased wager handle (i.e., the total amount of money bet on a race or over a period of time) since patrons may be distracted from handicapping the next race and placing wagers while the patron is calculating and investigating results from finished races. The wager handle may also decrease from the inefficient use of wager terminals by patrons investigating results of completed wagers instead of placing new wagers. Thus, the patron may be more inclined to place a minimum or low wager amount to simplify translation of tote board results to see if they have won, which also decreases wager handling.

Problems also exist at offsite parimutuel gaming establishments. For instance, when telephone wagers are placed, the patrons have no accessible record of their bet selections without a printed receipt. Although the patron may be able to access his/her wagers via the Internet if the offsite parimutuel gaming establishment has an Internet website, the patron may become dissatisfied with the added effort of having to retrieve the results. Further, since patrons sometimes have to leave the track or offsite betting facility before the race goes official, obtaining the official results to see if they win is an annoyance to the patrons.

Participation in gaming activities at offsite parimutuel gaming establishments may also lead to uncertainty for the patrons as to whether race results have gone official. The length of time it takes to make results official can vary greatly due to technical delays or track judge delays. Also, when a patron calls or logs in to check race results, the patrons don't know whether the balance retrieved in their account is before or after official prices. A lack of visibility for race results and prices, and of the patron's individual wager results exist. For instance, although some account wagering systems have result lines, they are not filtered in relation to the patron's wagers and are onerous to navigate. Further, telephone wagering lines generally only recap a total balance of the patron, and not an individual bet or ticket result.

Thus, a need exists for a more efficient parimutuel gaming activity and a parimutuel gaming system that solves the aforementioned difficulties.

BRIEF SUMMARY OF THE INVENTION

The present invention, in its various exemplary embodiments, comprises parimutuel wagering methods and systems that make it easier for patrons to determine the results of a parimutuel wager. The methods and systems provide a convenient manner to notify patrons how their wager fared once the results of a parimutuel race are made final. Thus, parimutuel gaming establishments employing the parimutuel gaming methods and systems described herein will have reduced costs of operation, while increasing the amount of wagering and, thus, wager handle.

In one exemplary embodiment, a method of sending a message to a patron of a parimutuel gaming system is disclosed. The method includes providing at least one patron an opportunity to establish an identity on a parimutuel gaming system. Responsive to the at least one patron establishing the identity, the at least one patron is provided with an opportunity to associate a virtual address with the identity. Responsive to the at least one patron associating the virtual address with the identity, a message is sent to the virtual address.

In another exemplary embodiment, a system for conducting a parimutuel gaming activity is described. The system includes a computer such as a server operatively configured with software. The software is operatively configured to cause the server to conduct the parimutuel gaming activity. In the parimutuel gaming activity, at least one patron is provided an opportunity to associate a virtual address with an identity of the at least one patron. Responsive to the at least one patron associating the virtual address with the identity, a message is sent to the virtual address.

In a further exemplary embodiment, a method of communicating a result of a parimutuel gaming activity includes providing at least one player an opportunity to place at least one parimutuel wager on a race. The at least one player is also provided with an opportunity to associate a virtual address with the at least one parimutuel wager. Responsive to the at least one player associating the virtual address with the at least one parimutuel wager, a message is sent to the virtual address, wherein the message includes a result of the at least one parimutuel wager.

DETAILED DESCRIPTION OF THE INVENTION

Figures 1, 2:
FIG. 1 is display of results of a parimutuel race of the prior art.
FIG. 2 illustrates two parimutuel wager tickets of the prior art.

Generally, the present invention discloses new and enhanced methods of conducting parimutuel gaming activities, and parimutuel gaming systems and gaming terminals configured for play of the parimutuel gaming activities. While the present invention is described in terms of certain exemplary embodiments, the specific details of these exemplary embodiments are set forth in order to provide a thorough understanding of the present invention. It will be apparent, however, that the present invention may be practiced in various combinations or modifications of the exemplary embodiments presented herein.

The exemplary embodiments described herein may be implemented on parimutuel gaming systems including on-line wagering systems and betting, or wager, terminals located at parimutuel gaming establishments including, but not limited to, thoroughbred horse tracks, harnessed horse tracks, car tracks, greyhound racetracks, jai-alai frontons and off-track betting facilities. Parimutuel wagering systems are also referred to as "tote systems" and conventionally include wagering terminals, a computer server having computers and peripherals, software configured to conduct the parimutuel gaming activities, tote boards, and other displays and video generation equipment. The parimutuel gaming systems process wagers, calculate and display odds, probables and payoff information, and the wagering terminals perform the functions of selling and cashing betting tickets, as well as managing accounts set up by players.

As described herein, reference will be made to runners participating in a race and the results of completed races. As known in parimutuel wagering, wagers are also made on games of jai-alai and other sporting events. Thus, as described herein, the reference to a runner in a race also includes a participant, such as a player or a team, in a game of jai-alai or another sporting event and the reference to a race will also include a game of jai-alai or the other sporting event. In jai-alai, the participants score points, and the first participant to score a specified number of points wins. Thus, the jai-alai participants "race" to be the first participant to score the specified number of points, and participants are placed based on the number of points scored, in a manner similar to runners placing in a race.

The parimutuel gaming activities described herein may be implemented by configuring software and hardware of the parimutuel gaming systems to display, present and offer the parimutuel gaming activities to patrons of parimutuel gaming establishments or to patrons using on-line or telephone wagering systems. The gaming activities are presented or displayed to the patrons, who will also be referred to herein as players, with wagering terminals that include self-service terminals or teller operated terminals, websites or telephone menus. As known in the art, the wagering terminals include a screen for displaying information related to the parimutuel gaming activity to the player at the self-service terminal or the teller at the teller operated terminal. The terminals also include a device that allows the player or the teller to input wagers made by the players. The device may be a keypad or keyboard having keys or buttons, a touch screen, an overlying touch screen, a light pen, a mouse, a touchpad, a trackball, a voice recognition device or any other known input device associated with electronic devices. The exemplary embodiments described herein may also be implemented on electronic interfaces in other media including telephones or the Internet.

Figure 3:
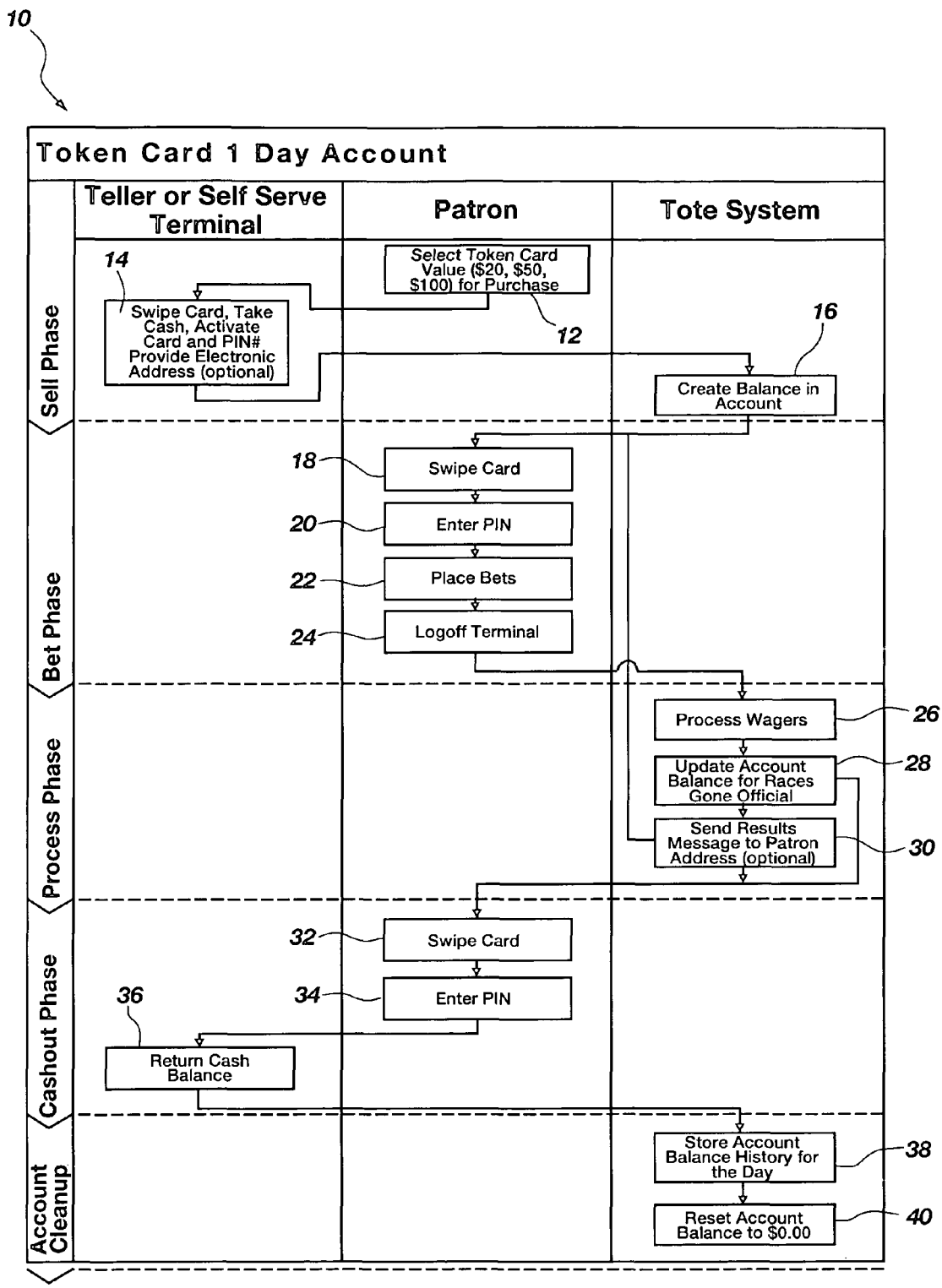
FIG. 3 depicts a flowchart of one exemplary embodiment of a method of communicating parimutuel racing information.

Referring to FIG. 3, there is shown a flowchart 10 of one exemplary embodiment of a method of results messaging where a result of a parimutuel activity is communicated to a patron generally at flowchart 10. The flowchart illustrates results messaging implemented in a racetrack environment. A patron is provided with an opportunity to log on or establish an identity on a parimutuel gaming system. The player may establish the identity by selecting a token card, for example a card having a magnetic stripe associated therewith, a card having a radio frequency identity tag (RFID) associated therewith, or a card having a barcode associated therewith, or establishing an account having a predetermined monetary value at dialog box 12. The patron interacts with the parimutuel gaming system with an input device. The input device may be a device located at the parimutuel gaming venue, a home computer used to access parimutuel gaming activities on-line, or a device used for instant messaging such as personal digital assistant (PDA), cell-phone, pager, or a messaging phone (i.e., a BLACKBERRY® brand messaging phone). The patron establishes the identity by purchasing the token card or by associating the identity with an account number in the input device, such as a wagering terminal including a self-service wagering terminal or a teller terminal of the parimutuel gaming system as indicated at box 14. The parimutuel gaming system may be located at a racetrack, a jai alai fronton, an OTB site, or other venue. The token card is swiped at the input device, activated and a personal identification such as a personal identification number (PIN), other password, or a biometrix identifier such as, for example, a fingerprint, voice print or retinal-print recognition hardware and associated software, is established at box 14.

At box 14, the patron is also provided with an opportunity to associate a virtual address of the patron at the input device with the token card, the account, a wager or a group of wagers. Although the flowchart 10 indicates that the patron associates the virtual address before placing the wager, it will be apparent that the patron may associate the virtual address with the token card, the account, a wager or a group of wagers after the wager is placed, or at any other time. As used herein, "virtual address" will be used to refer to an electronic address associated with or unique to the patron including, but not limited to, an email address, a domain name, an internet protocol address, a telephone number, a cellular telephone address, a pager address, any other known electronic address, or combinations thereof.

An account balance of the patron is created by the parimutuel gaming system at dialog box 16. To effectuate placement of a wager, the token card is swiped at the input device by the patron or teller at dialog box 18. Once the token card is identified by the wagering terminal, the patron is prompted by the parimutuel gaming system to enter his/her PIN or password, and upon entry of the appropriate personal identification at dialog box 20, the patron is provided with an opportunity place the wager at dialog box 22. The patron logs off the wager terminal at dialog box 24 and at post time, a parimutuel race is run.

Upon completion of the race and the results of the race being made final, the parimutuel gaming system processes wagers placed by patrons on the race at dialog box 26 and updates account balances of the patrons with official race results at dialog box 28. If the patron associated a virtual address with their token card, account, wager, or group of wagers, an electronic message including information is generated by the parimutuel gaming system and transmits the official race results, payout odds, the amount of money won, updated account balance, other information unique to the patron, or any combination thereof to the virtual address associated with the patron at dialog box 30. The message may be a textual message, a graphical message, an audio message, or any combination thereof. In the exemplary embodiment, software of the computer server or the parimutuel gaming system is configured to process the wagers for each patron and transmit the official race results and payout odds to the virtual address.

Once the patron receives the electronic message, the patron can access their account by swiping the token card at a wagering terminal at dialog box 32 and entering the appropriate PIN or password at dialog box 34. The wagering terminal returns a cash balance to the patron at dialog box 36 by a cash payment or updating the patron's account, and an account balance history for the patron is stored for the day at dialog box 38. If the patron is done wagering for the day, the patron's account balance is reset to $0.00 at dialog box 40.

In a further exemplary embodiment, the parimutuel gaming system is configured to proactively send messages on other key wagering details in addition to race results to the player's virtual address. The other wagering details may include, but are not limited to: a record of the wagers made by the patron; the fact that a race has been declared official; a result of each wager placed by the patron; official prices for all or a portion of the pools available for betting in a race; a total win or loss for the group of wagers; an updated account balance if the wagers are associated with a patron's account; a race runner(s) that the patron wagered on; a narrative describing a result of a race; a narrative describing the race or a runner's performance in the race, e.g., "#6 Redcuda: hustled to front, dictated pace outside foes, forged clear, driving;" or any combination thereof.

In another exemplary embodiment, the patron is provided with an opportunity to associate the virtual address with a player account, a token card, a wager, or group of wagers of a parimutuel gaming system associated with a telephone wagering system, the Internet, a simulcasting environment, an OTB site, or any combination thereof. When the parimutuel gaming system is associated with the telephone wagering system, the input device is a telephone, and the parimutuel gaming system may be further configured with a voice recognition system or a touch-tone recognition system. When the parimutuel gaming system is associated with the Internet, the input device is a computer terminal and the parimutuel gaming system is associated with a server. The race results or other wagering details are sent to the virtual address of the patron as previously described herein. In yet another exemplary embodiment, the player is provided with the opportunity to associate an electronic identification code of a personal wagering terminal, such as a POCKET PC, associated with a parimutuel gaming system and serving as the input device capable of interacting with the personal wagering terminal with the patron's account, token card, wager, or group of wagers. Race results or other wagering details are sent from the parimutuel gaming system to the personal wagering terminal using wireless technology in a manner analogous to the methods described herein.

In an additional exemplary embodiment, the electronic message provides the patron with an opportunity to place another wager by replying to the electronic message that transmits the race results or other wagering details. For example, the message transmitted to the patron may include a message reciting, e.g., "to make a $2 Win bet on the next race at this track respond to this message with the horse #," or similar message. In yet another exemplary embodiment, the electronic message is delivered to the patron as a prompt or a reminder, wherein the message includes a wager detail of a parimutuel gaming activity, such as a specified time remaining (in minutes) before post in order to bet on another race, e.g., "Churchill Race #3, Pick 6 now 5 MTP (minutes to post)."

Figure 4:
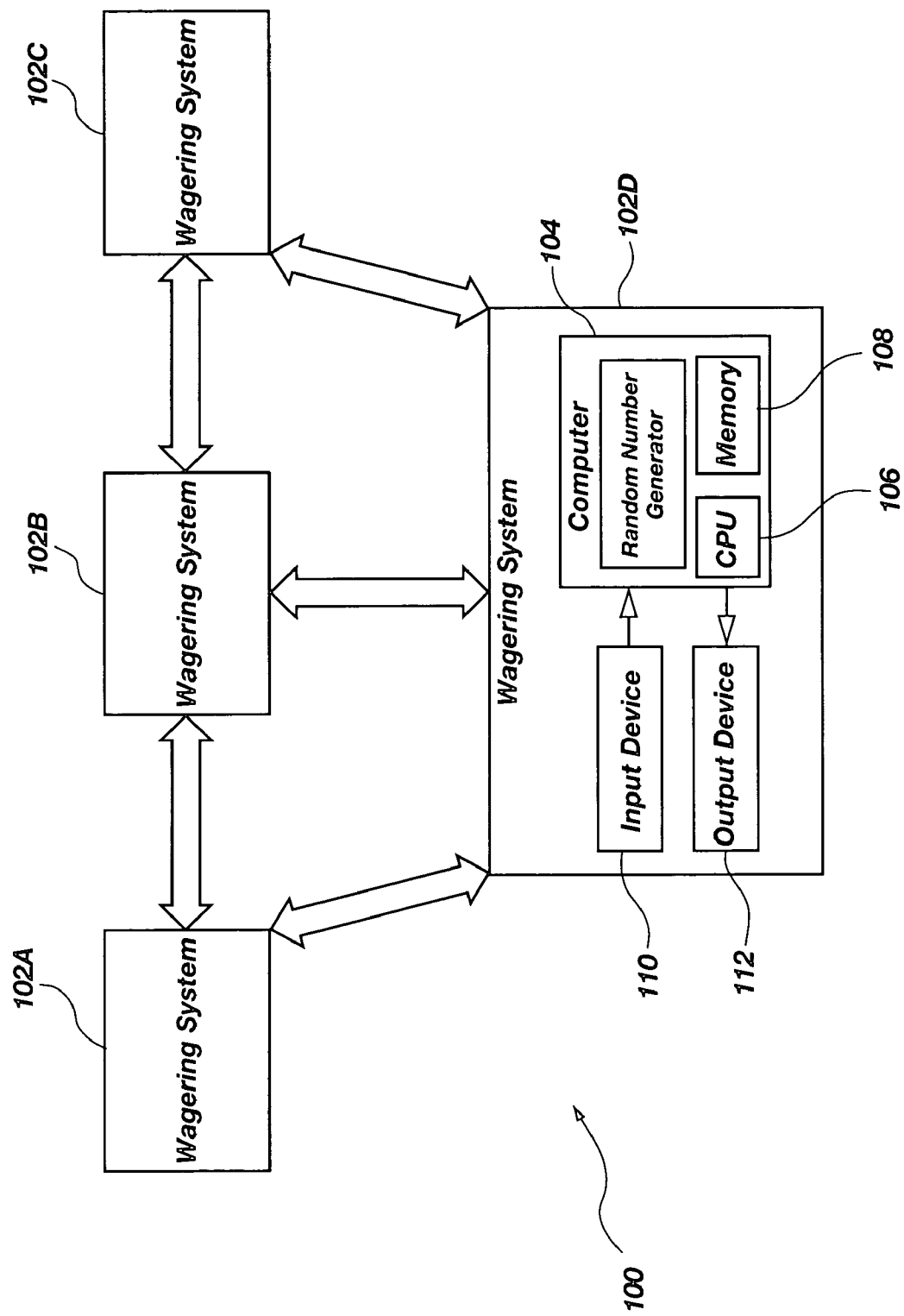
FIG. 4 is a schematic of a wagering system and network which may be used in accordance with the parimutuel gaming activities described herein.

Referring now to FIG. 4, a network 100 for conducting the parimutuel gaming activities described herein is illustrated. The network 100 may include a plurality of parimutuel gaming systems 102A-102D which are operably coupled to one another. Each system 102 may include, for example, a computer 104 with a central processing unit (CPU) 106 or other processing device and associated memory 108. Each computer 104 may be configured with software that enables the computer 104 to conduct the parimutuel gaming activities described herein. An input device 110 may be coupled with the computer 104 to interact with players and patrons and receive selections of the players and patrons. The input device 110 may further include a device for accepting a monetary value associated with a parimutuel wager wherein the device may include, for example, a coin collector, a bill collector or a card reader. An output device 112 may also be coupled with the computer 104 and configured, for example, to display the parimutuel gaming activities described herein. Such an output device 112 may include, for example, a visual display and/or a printing device. Additionally, such an output device 112 may be configured to display the results of a parimutuel gaming activity taking place at a remote venue. Thus, for example, a first parimutuel gaming system 102A may be located at a first venue while another parimutuel system 102D may be located at a second remotely located venue. Thus, the network 100 formed of the plurality of parimutuel gaming systems 102A-102D may enable wagering on, and monitoring of, parimutuel gaming activities at multiple venues substantially simultaneously if so desired. In another embodiment, the parimutuel gaming systems 102A-102D may be located at a single venue where, for example, a first parimutuel gaming system 102A acts as a server while other parimutuel gaming systems 102B-102D act as terminals coupled with the server 102A.

The exemplary embodiments described herein are not intended to limit the invention or the scope of the appended claims. Various combinations and modifications of the embodiments described herein may be made without departing from the scope of the present invention and all modifications are meant to be included within the scope of the present invention. For instance, the various embodiments of the parimutuel gaming activities described herein may be used in conjunction with other embodiments of the parimutuel gaming activities described herein. Further, the parimutuel gaming activities described herein may be implemented by configuring software or hardware systems of parimutuel gaming systems and used in conjunction with existing parimutuel gaming systems. Thus, while certain exemplary embodiments and details have been described for purposes of exemplifying the invention, it will be apparent to those of ordinary skill in the art that various changes to the invention described herein may be made without departing from the scope of the present invention, which is defined in the appended claims.

What is claimed is:

1. A method of sending a message to a patron of a computerized parimutuel gaming system, the method comprising:
   providing at least one patron an opportunity to place at least one parimutuel wager on a race;
   providing at least one patron an opportunity to establish an identity on a computerized parimutuel gaming system operatively configured with hardware and software;
   responsive to the at least one patron establishing the identity, providing the at least one patron an opportunity to associate a virtual address with the identity;
   responsive to the at least one patron associating the virtual address with the identity, sending a message from the computerized parimutuel gaming system to the virtual address comprising sending a result of the at least one parimutuel wager responsive to completion of the race.

2. The method according to claim 1, wherein providing the at least one patron an opportunity to place at least one parimutuel wager on a race comprises providing the at least one patron an opportunity to place at least one parimutuel wager on a race from the virtual address.

3. The method according to claim 1, further comprising:
   providing the at least one patron an opportunity to place at least one parimutuel wager on a race by responding to the message.

4. The method according to claim 1, wherein providing the at least one patron with the opportunity to establish the identity comprises providing the at least one patron an opportunity to purchase a token card, establish an account, place at least one wager, or any combination thereof.

5. The method according to claim 1, wherein sending the message from the computerized parimutuel gaming system to the virtual address comprises at least one of transmitting the message from the computerized parimutuel gaming system to an email address, transmitting the message to a telephone number, transmitting the message to a cellular telephone number, transmitting the message to a pager address, and instant messaging.

6. The method according to claim 1, further comprising:
   assigning a personal identifier to the identity of the at least one patron; and
   enabling the at least one patron to access the identity by entering the personal identifier on the parimutuel gaming system.

7. The method according to claim 6, wherein assigning the personal identifier comprises assigning a PIN, a password, or a biometrix indicator to the identity of the at least one patron.

8. The method according to claim 1, wherein sending the message from the computerized parimutuel gaming system to the virtual address comprises at least one of sending a record of wagers made by the at least one patron, sending a notification that a race is declared official, sending official prices for at least one pool of a race, sending an updated account balance of the at least one patron, sending a narrative describing a race, sending a narrative describing a runner's performance in the race, and sending a specified time remaining before a post time of a race.

9. A system for conducting a parimutuel gaming activity, the system comprising:
   a computer operatively configured with software; and
   wherein the software is operatively configured to enable the computer to conduct the parimutuel gaming activity, wherein, in the parimutuel gaming activity:
   at least one patron is provided with an opportunity to associate a virtual address with an identity of the at least one patron wherein the software is operatively configured to enable the computer to associate the virtual address with at least one of a token card, an account established by the at least one patron, and at least one parimutuel wager placed by the at least one patron; and responsive to the at least one patron associating the virtual address with the identity, sending a message to the virtual address.

10. The system of claim 9, further comprising an input device for interacting with the at least one patron.

11. The system of claim 10, wherein the input device comprises at least one of a wagering terminal, a telephone, a computer terminal, and a personal wagering terminal.

12. The system of claim 9, wherein the computer is operatively connected to a telephone system.

13. The system of claim 9, wherein the computer is operatively connected to the Internet.

14. The system of claim 9, wherein the software is operatively configured to provide the at least one patron an opportunity to place at least one parimutuel wager on a race and responsive to a completion of the race, sending the message from the computer to the virtual address, wherein the massage includes a result of the at least one parimutuel wager.

15. The system of claim 9, wherein the software is operatively configured to enable the computer to provide the at least one patron an opportunity to place at least one parimutuel wager.

16. The system of claim 9, wherein the software is operatively configured to enable the computer to send the message as at least one of a text message, a graphical message, and an audio message.

17. The system of claim 9, wherein the software is operatively configured to enable the computer to assign a personal identifier to the identity of the at least one patron.

18. The system of claim 17, wherein the personal identifier is a PIN, a password, or a biometrix indicator.

19. A method of communicating a result of a parimutuel gaming activity to a player of a computerized parimutuel gaming system, the method comprising:
providing at least one player an opportunity to place at least one parimutuel wager on a race over a computerized parimutuel gaming system operatively configured with hardware and software;

providing the at least one player an opportunity to associate a virtual address with the at least one parimutuel wager comprising providing the at least one patron with an opportunity to purchase a token card, establish an account, place at least one wager, or any combination thereof; and responsive to the at least one player associating the virtual address with the at least one parimutuel wager, sending a message from the computerized parimutuel gaming system to the virtual address, wherein the message comprises a result of the at least one parimutuel wager.

20. The method according to claim 19, wherein providing at least one player an opportunity to place at least one parimutuel wager on a race over a computerized parimutuel gaming system operatively configured with hardware and software comprises providing the at least one player an opportunity to place at least one parimutuel wager from the virtual address.

21. The method according to claim 19, further comprising: providing the at least one player an opportunity to place another parimutuel wager by responding to the message.

22. The method according to claim 19, further comprising at least one of:
sending a record of wagers made by the at least one patron to the virtual address, sending a notification that a race is declared official to the virtual address, sending official prices for at least one pool of a race to the virtual address, sending an updated account balance of the at least one patron to the virtual address, sending a narrative describing a race or a runner's performance in the race to the virtual address, and sending a specified time remaining before a post time or a race to the virtual address.

23. The method according to claim 19, further comprising: assigning a personal identifier to the identity of the at least one patron; and allowing the at least one patron to access the identity by entering the personal identifier on the computerized parimutuel gaming system.

24. The method according to claim 23, wherein entering the personal identifier comprises entering a PIN, a password, or identifying a biometrix indicator.

* * * * *